United States Patent
Lin

(10) Patent No.: US 6,807,741 B1
(45) Date of Patent: Oct. 26, 2004

(54) FLUIDTIGHT LEVEL DEVICE

(75) Inventor: Chih-Hsiung Lin, Sindian (TW)

(73) Assignee: ERA Optoelectronics Inc., Taipei (TW)

( * ) Notice: Subject to any disclaimer, the term of this patent is extended or adjusted under 35 U.S.C. 154(b) by 0 days.

(21) Appl. No.: 10/649,812

(22) Filed: Aug. 28, 2003

(51) Int. Cl.[7] .............................................. G01C 15/02
(52) U.S. Cl. ......................................... 33/286; 33/227
(58) Field of Search ..................... 33/286, 227, 281, 33/282, 283, 285, DIG. 21

(56) References Cited

U.S. PATENT DOCUMENTS

| | | | | |
|---|---|---|---|---|
| 4,517,749 A | * | 5/1985 | Scotto | 33/286 |
| 5,184,406 A | * | 2/1993 | Swierski | 33/227 |
| 5,509,209 A | * | 4/1996 | Swierski | 33/282 |
| 5,619,802 A | * | 4/1997 | Rando et al. | 33/DIG. 21 |
| 5,872,657 A | * | 2/1999 | Rando | 33/286 |
| 6,073,354 A | * | 6/2000 | Rando | 33/291 |

* cited by examiner

Primary Examiner—Christopher W. Fulton
(74) Attorney, Agent, or Firm—Troxell Law Office PLLC

(57) ABSTRACT

A watertight fluid level device comprises a container in which a fluid is filled and a floating body, a shaft is connected to the upper end of the floating body; the upper end of the shaft is passed through a film. The film and the shaft are airtight connected. The circumference of the film is connected to the opening of the container to prevent the fluid of the container from leaking. A seat body is connected to the upper end of the shaft; the floating body floats on the surface of the fluid, the seat body is driven to maintain at a level state automatically by the shaft.

7 Claims, 4 Drawing Sheets

FLUIDTIGHT LEVEL DEVICE

BACKGROUND OF THE INVENTION

1. Field of the Invention

The present invention relates to a device using gravity force to provide level, and more particularly to a device using a floating body to float on a fluid surface in order to allow the floating body to maintain at a level state. The level device according to the present invention can be combined with a laser ray indicator to use on indication for level and/or plumb.

2. Description of Related Art

A visible laser ray level and/or plumb indicator is always used in construction, architecture or upholstery work to provide a mark on the surface of a construction object to maintain an accurate level and/or plumb.

U.S. Pat. No. 5,619,802 "AutomaticLevel and Plumb-Tool" discloses that a laser module being able to emit visible light can be disposed in fluid. A spring is connected at the upper side of the laser module to allow the laser module to maintain at a level state in the fluid. The laser module can emit a lever indication ray and plumb indication ray to pass respectively through the fluid to project on other subject. The arrangement to lead the laser ray to pass the fluid could yield refraction phenomena; this may influence the indication accuracy of the level ray and the plumb ray. U.S. Pat. No. 6,177,987 "Laser Level" discloses that a laser module, which is able to emit visible light, is connected with a shaft. The two ends of the shaft are pivoted to the opposite sides of a container. The bottom part of the laser module is disposed in a fluid, which is stored in the container. The laser module can adjust its own level automatically by floating force yielded from the fluid when the container is inclined. But, when the container is inclined along the two ends of the shaft. The laser module has no way to use the floating force of the fluid to adjust level automatically. Moreover, the container without a cover can prevent the fluid from leaking out of the container during transportation.

SUMMARY OF THE INVENTION

The main object of the present is to provide a level device, connecting a film at the opening of a container to prevent fluid in the container from leaking out thereof. A shaft is connected to the film, and one end of the shaft is connected to a floating body while another end of the shaft is projected out of the container to connect with a seat body.

Another object of the present invention is to provide a level device, adjusting automatically the level of the seat body installed outside the container by floating body installed in the fluid.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
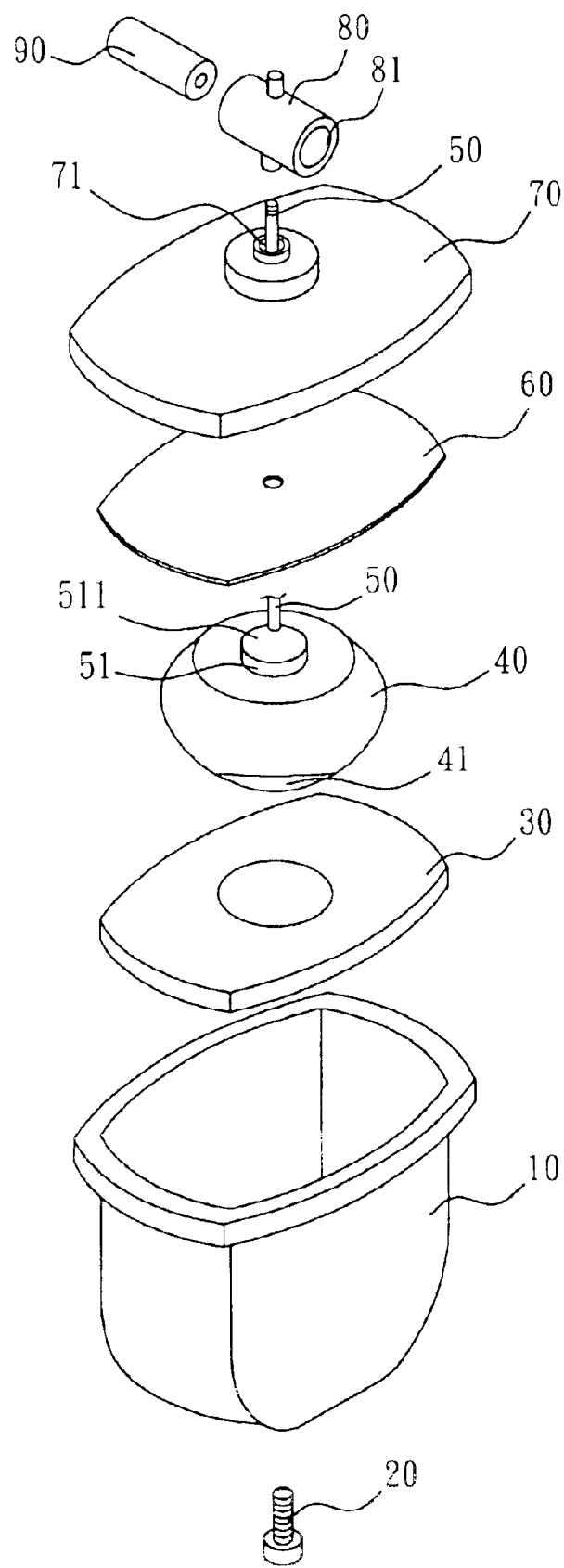
FIG. 1 is an explosive schematic view of a level device according to the present invention.
Figure 2:
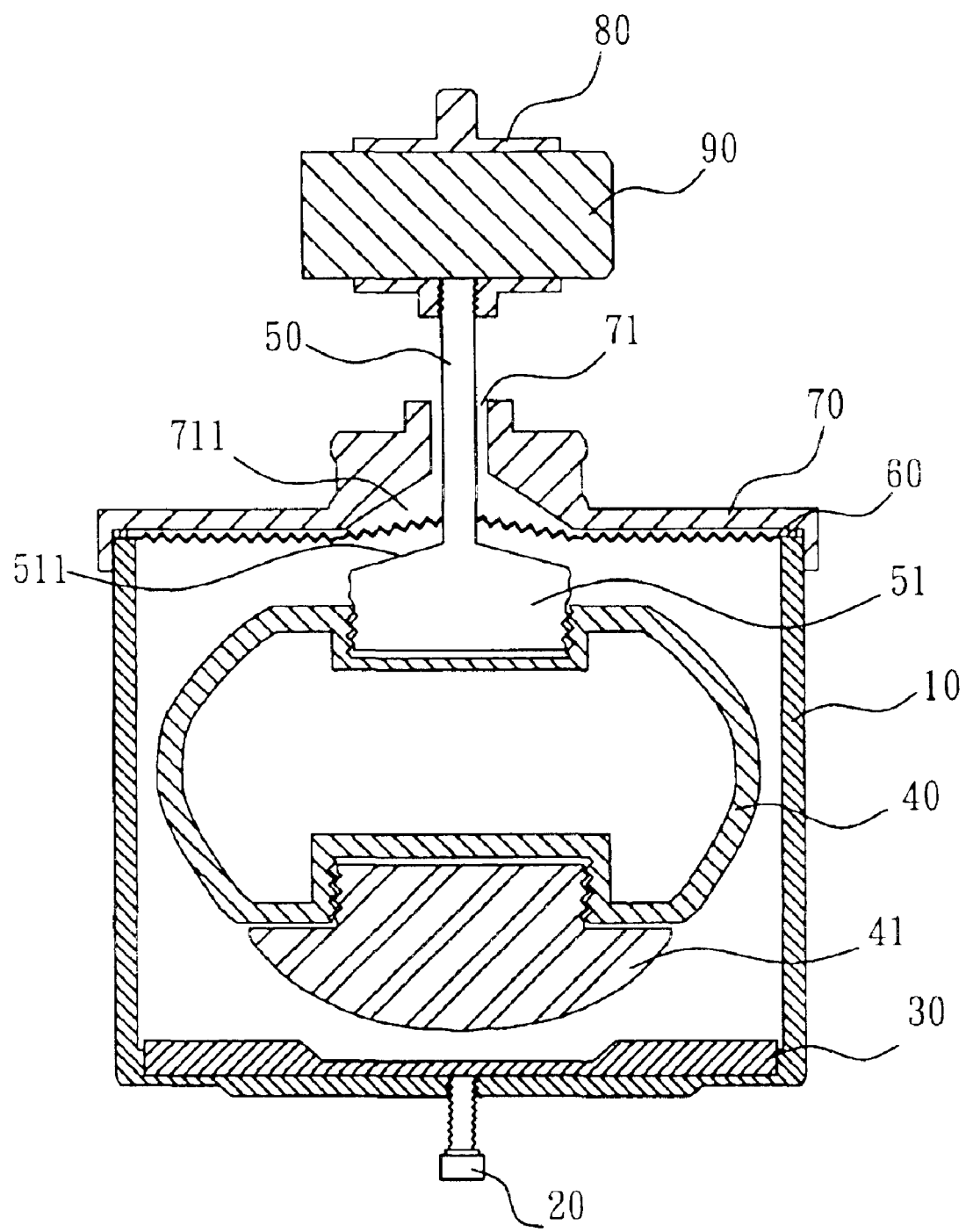
FIG. 2 is a sectional schematic view of a level device according to the present invention.

Please refer to FIGS. 1 and 2. A level device according to the present invention comprises a container 10, a screw bolt 20 screwed to the outside part of the bottom of the container 10, a first film 30 connected to the inner part of the bottom of the container 10, a floating body 40 whose bottom is connected with a pairing weight block 41 and upper end is connected to the bottom 51 of a shaft 50, a second film 60 passed through by and connected with the shaft 50, a cover having a hole 71 for the shaft 50 to pass through and to exist a space between the hole 71 and the shaft 50, a seat body 80 connected at the upper end of the shaft 50 and a laser module 90 engaged in a hole 81 disposed in the seat body 80. Here, the cover 70 has a bigger-opening-shaped engaging part 711 at the lower part of the hole 71 as FIG. 2 shows. The upper end of the bottom part 51 of the shaft 50 has an engaging part 511 whose projecting shape is matched with the shape of the engaging part 711. The circumference of the second film 60 is connected to the opening of the container 10. The cover 70 is connected to the opening of the container 10 and the outside of the second film 60.

Figure 3:
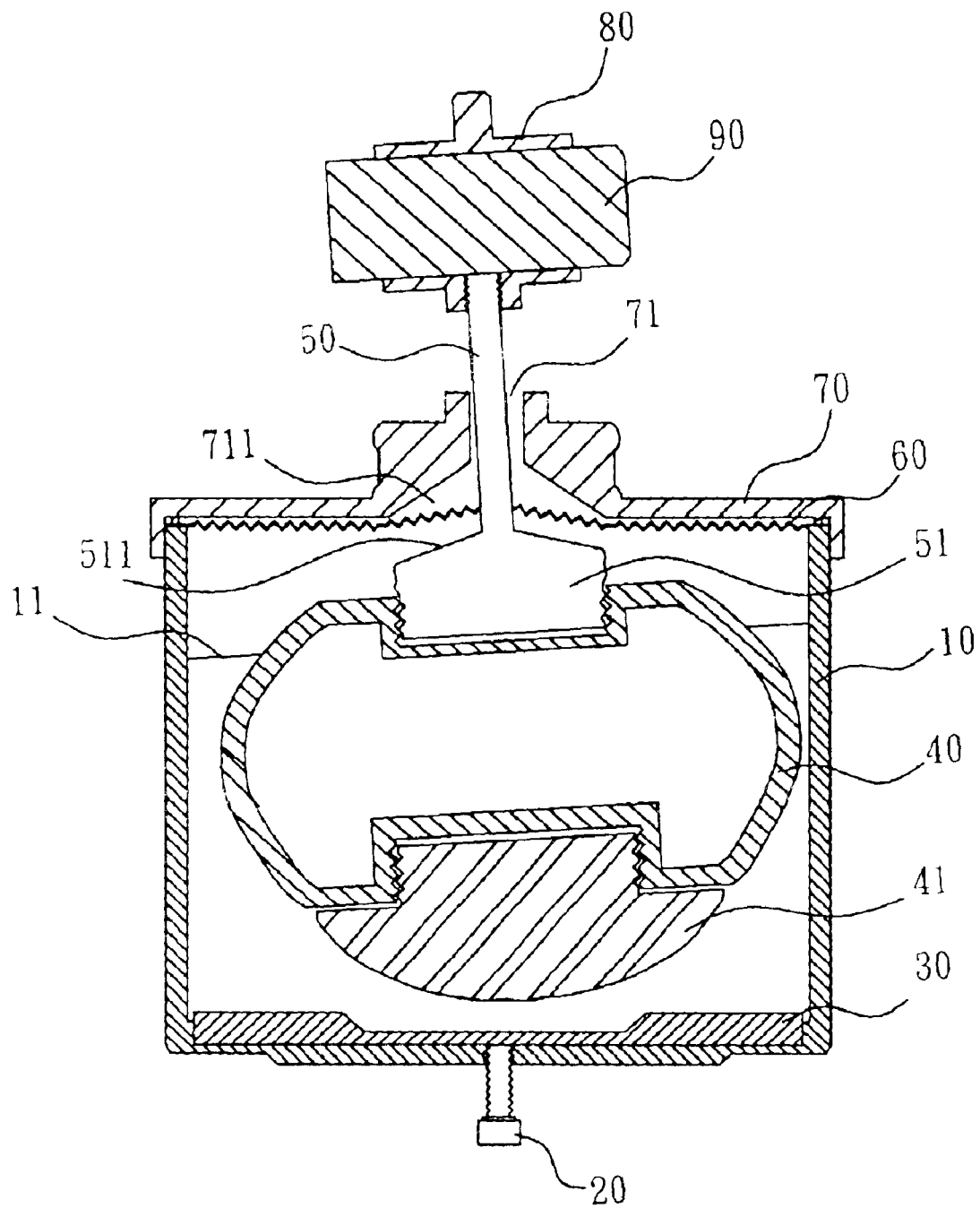
FIG. 3 is a sectional schematic view of a level device in use according to the present invention.

Please refer to FIG. 3. When the level device according to the present invention is used, a proper amount of fluid 11, which is a fluid material such as water or oil or mixture of both, is filled into the container 10. A proper pairing weight block 41 is chosen to cause the floating body 40 to float on the surface of the fluid 11 after the floating body 40, the shaft 50, the seat body 70 and the laser module 90 are connected together. The floating body 40 can adjust itself automatically to allow its center of gravity to be perpendicular to the earth's center so as to maintain the seat body 80 and the laser module 90 horizontally by the floating force of the fluid 11 even if the container 10 is inclined at a certain angle. The connection angle between the second film 60 and the shaft 50 can be adjusted without being torn apart from each other at the connection point of the second film 60 and the shaft 50 because the second film 60 is flexible. The fluid 11 cannot be leaked out of the container 10 by sealing the opening of the container 10 with the second film 60.

Figure 4:
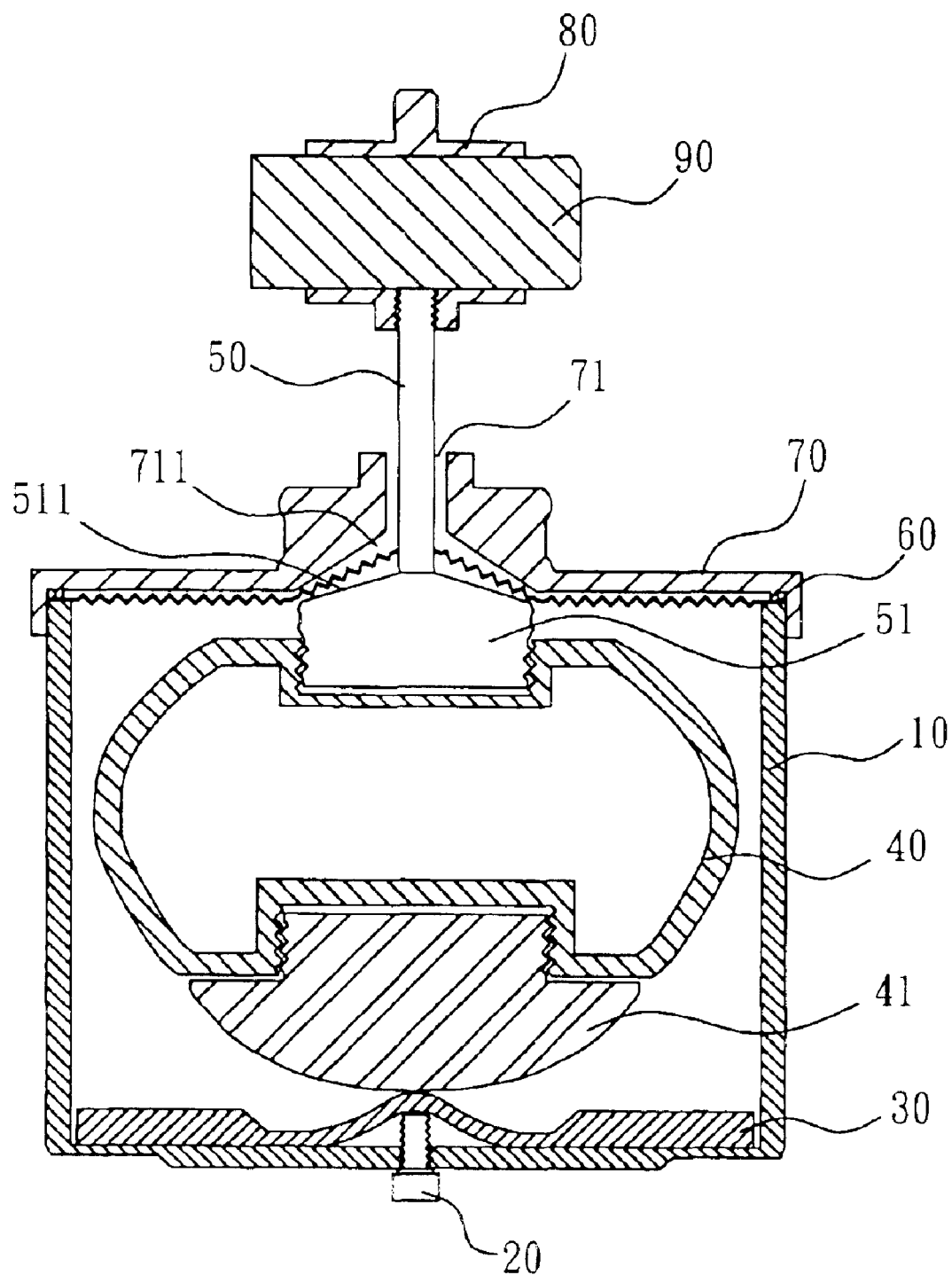
FIG. 4 is a sectional schematic view of a level device used in fixing a floating body according to the present invention.

Finally, please refer to FIG. 4. The screw bolt 20 can be rotate upward to press against the flexible first film 30 to cause the first film 30 to push the pairing weight block 41 upward. Consequently, the floating body 40 and the bottom part of the shaft 50 are moved upward to cause the engaging part 511 of the bottom part 51 to engage with the engaging part 711 of the cover 70. Therefore, the floating body 40 is fixed in the container 10 and not to be shaken.

The first film 30 and the second film 60 of the present invention can be made from a flexible material such as silicon, rubber or plastic. The container 10, the floating body 40, the shaft 50, the cover 70, the seat body 80 and etc can be made from a plastic or metal material. The second film 60 is used to connect with the shaft 50 to keep the shaft 50 to be located in the middle of the opening 71 of the cover 70 so as to prevent the fluid 11 from leaking out of the container 10.

The seat body 80 of the present invention can be connected with a variety of different modules 90. And, level indication and/or plumb indication laser ray emitted from the laser module 90 is projected on the surface of an object directly instead of passing through a fluid else first. Therefore, the better level and/or plumb accuracy can be obtained.

It is noted that the level device described above is the preferred embodiment of the present invention for the purpose of illustration only, and are not intended as a definition of the limits and scope of the invention disclosed. Any modifications and variations that may be apparent to a person skilled in the art are intended to be included within the scope of the present invention.

What is claimed is:

1. A fluidtight level device, comprising a container in which a floating body is installed, the upper end of said floating body being connected with a shaft, the upper end of said shaft being passed through a film; said film and said shaft being airtight connected; the circumference of said film being connected to an opening of said container; a seat body being connected to the upper end of said shaft; thereby, said floating body being allowed to float on the surface of a fluid, said seat body being driven to maintain at a level state by said shaft, and said fluid being prevented from leaking after said fluid is filled into said container.

2. The level device according to claim 1, wherein a pairing weight block is connected to the bottom of said floating body.

3. The level device according to claim 1, wherein a cover is connected to the outside of an opening of said container, said container is installed outside said film; said shaft is passed through a hole of said cover; a spacing is existed between said hole and said shaft.

4. The level device according to claim 3, wherein said hole of said cover has a engaging part at the bottom thereof, and another engaging part is disposed at the upper end of the bottom of said shaft to match with said engaging part of said hole.

5. The level device according to claim 4, wherein another film is connected inside the bottom of said container; a screw bolt is screwed to the outside of the bottom of said container; thereby, said screw bolt can be driven to press said another film to move upward, further to driven said floating body and said shaft so as to allow said engaging part to engage with said another engaging part so as to fix said floating body in said container.

6. The level device according to claim 1, wherein a fluid is filled into said container; said floating body floats on the surface of said fluid.

7. The level device according to claim 1, wherein a laser module is connected to said seat body.

* * * * *